April 8, 1969 F. L. MIDDLETON 3,437,391
ASHTRAY
Filed Oct. 31, 1967

INVENTOR.
FOREST L. MIDDLETON
BY
ATTORNEYS

INVENTOR.
FOREST L. MIDDLETON
BY

ATTORNEYS

# United States Patent Office 3,437,391
Patented Apr. 8, 1969

3,437,391
ASHTRAY
Forest L. Middleton, Middleville, Mich., assignor to Lescoa, Inc., Grand Rapids, Mich., a corporation of Michigan
Filed Oct. 31, 1967, Ser. No. 679,486
Int. Cl. A47b 67/02; A47f 5/08; B60n 3/08
U.S. Cl. 312—247       3 Claims

ABSTRACT OF THE DISCLOSURE

Automobile ashtray with ash box element having a generally vertically extending track at each of its sides, a closure panel having a generally vertically extending track at each of its sides, a carriage element having ball bearings at its sides exposed to lie in the tracks of the ash box and the closure panel whereby the closure panel is vertically movable, and holding means associated with the closure panel and the ash box to releasably hold the closure panel with respect to the ash box.

Background

This invention is related to U.S. Patent No. 3,109,688 assigned to the assignee of this invention. This patent provided an ashtray adapted to be mounted in the interior of an automobile and the like which uniquely utilized ball bearings to provide the movement between the ash box and the dashboard thereof. With the structure disclosed therein, the ash box moved with maximum smoothness of operation without the use of expensive plastic guides which have always formed a part of such ashtrays. Friction and cocking of the component parts of the ashtray have been essentially eliminated through the structure disclosed. Several other valuable advantages have been proven as noted in Patent No. 3,109,688. The specific embodiment disclosed in this patent illustrated an ashtray moving horizontally with respect to the dashboard of the automobile.

With the advent of recent discussions concerning automobile safety, much redesigning of automobiles has been called for. An attempt is being made to eliminate protrusions of all kinds from the dashboard of the automobile. It is an object of this invention to provide a specific ashtray structure for use in automobiles and the like which completely and totally eliminates protrusions from the dashboard, even eliminating horizontal movement of the ashtray within the automobile. A further object of the invention is to provide such an ashtray which fully obtains all of the advantages noted with respect to utilization of a ball bearing structure providing movement between the parts in the ashtray.

Summary of the invention

This invention relates to an ashtray adapted to be mounted in the interior of an automobile and the like comprising an ash box element which includes a pair of generally vertical extending tracks at its sides. A closure panel including a pair of generally vertically extending tracks at its sides is provided to lie in front of the ash box. A carriage element is provided, having means for retaining ball bearings at its sides. Ball bearings are positioned in the retaining means, the ball bearings exposed to lie in the tracks of the ash box element and of the closure panel whereby the closure panel is vertically movable with respect to the ash box element through the ball bearings rolling in the tracks. A holding means is associated with the panel and the ash box element to releaseably hold the closure panel in a position covering the ash box element.

Description of the preferred embodiment

Figure 1:
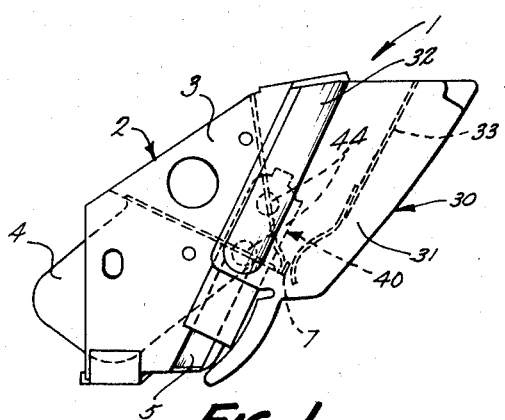
FIG. 1 is a side view of of the ashtray structure of this invention in closed position, certain parts being shown in phantom to better illustrate the invention.
Figure 6:
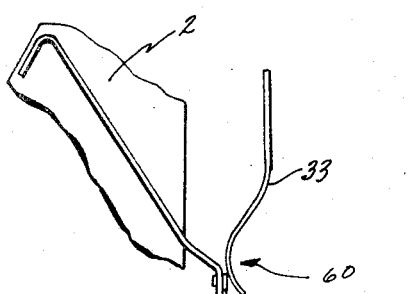
FIG. 6 is a view similar to FIG. 5, the holding means shown in holding position.
Figure 4:
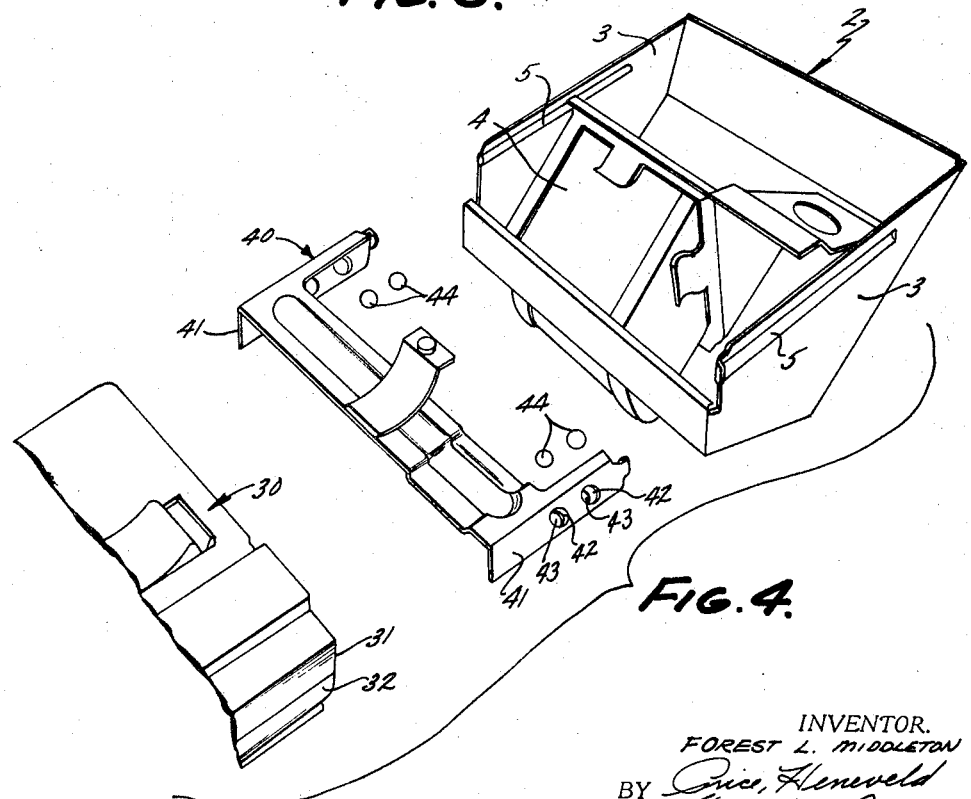
FIG. 4 is a perspective, exploded view of the apparatus.

The preferred embodiment of the ashtray structure 1 includes an ash box element 2, a closure panel 30, a carriage element 40 and a holding means 60 (FIGS. 1, 4 and 6).

Figure 2:
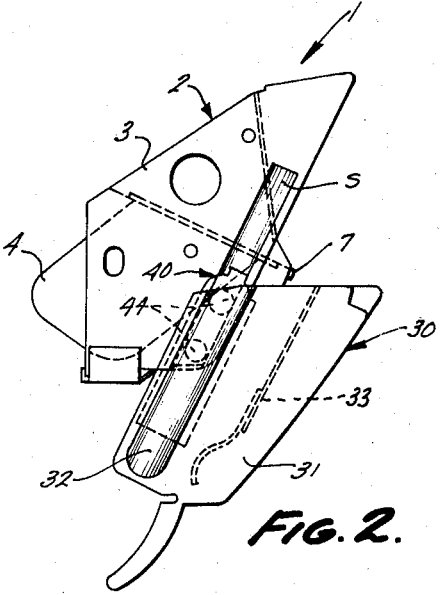
FIG. 2 is a view similar to FIG. 1, the ashtray structure in open position.
Figure 3:
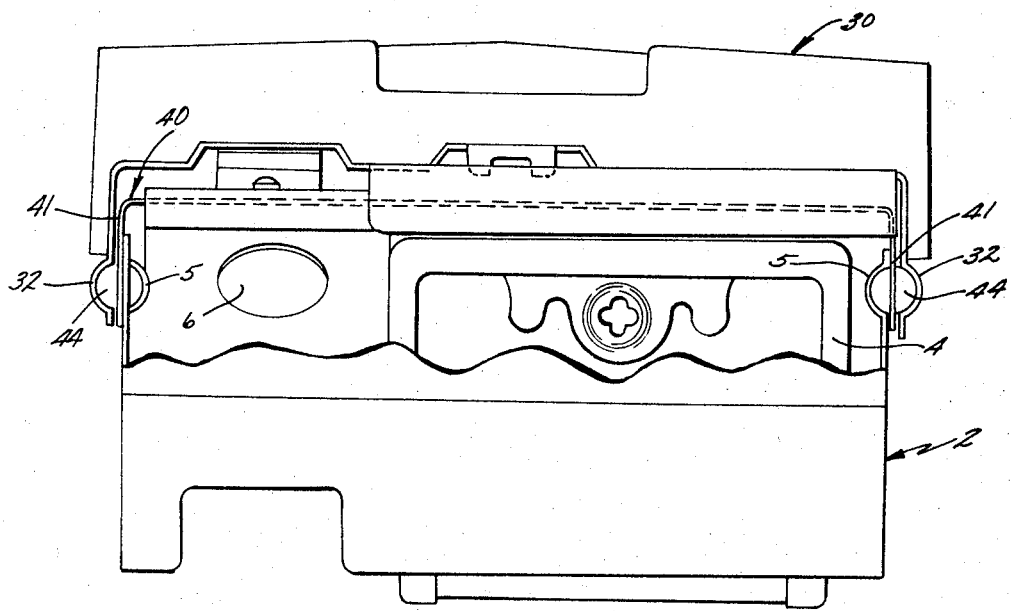
FIG. 3 is a plan view of the apparatus, certain portions being broken away to better show the invention.

Ash box element 2 includes a frame structure having side walls 3 for supporting and holding an ash box 4 (FIGS. 1 and 4). An elongated bead 5 is formed in each of the sides 3 of the frame, the beads extending generally vertically therealong. Suitable structure for reception of a cigarette lighter may be provided as shown at 6 (FIG. 3). A button 7 is positioned on the front of the frame of the ash box element, this button comprising part of the holding means 60 to be described in more detail hereinafter. The entire ash box element 2 is adapted to be mounted within the dashboard of an automobile in generally the position shown in FIGS. 1 and 2.

The closure panel 30 is adapted to comprise part of the dashboard (not shown) of an automobile. The panel includes a pair of flanges 31 along its sides, each flange including an elongated bead 32 extending generally vertically therealong (FIGS. 1 and 4). A suitable finishing padding may be mounted on the panel to enable it to lie flush with the dashboard of the automobile, together with a suitable recess for movement of the panel with respect to the ash box element. On the interior face of the panel, a spring member 33 is mounted for frictional engagement with the button 7, this engagement to be more fully described hereinafter.

The carriage element 40 includes a pair of flanges 41 at its sides, each flange containing a pair of openings 42 therein together with tabs positioned at the sides of the openings (FIG. 4). The openings are of a size sufficient to receive ball bearings 44 therein to be retained by means of tabs 43. The flanges are of a thickness such that the sides of the ball bearings 43 are exposed for engagement with adjacent surfaces.

In assembly (FIGS. 1 and 2), the carriage element 40 is positioned against the front face of the ash box element 2, the flanges 41 of the carriage element 40 lying adjacent the outer sides 3 of the ash box element 2. The ball bearings 44, positioned in the carriage element 40 as described, lie within the beads 5 in the sides 3 of the ash box element. The closure panel 30 is positioned against the carriage element 40 at the front face of the ash box element 2, the flanges 31 of the closure panel lying adjacent the flanges 41 of the carriage element, the ball bearings 44 lying within the beads 32 in the flanges 31 of the closure panel 30.

Figure 5:
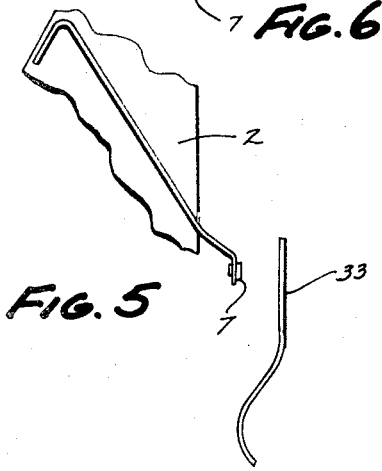
FIG. 5 is a side view of the holding means in released position.

When thus assembled, relative movement is possible between the closure panel 30 and the ash box element 2 through the carriage element 40. The ball bearings 44 in the carriage element 40 rotate within the respective beads 5 and 32 in the ash box element 2 and closure panel 30. Due to the positioning of the ash box element in the dashboard of the automobile, and the positioning of the beads 5 therein and the beads 32 in the closure panel 30, the closure panel moves generally vertically with respect to the ash box element as shown in FIGS. 1 and 2. When the closure panel is positioned as shown in FIG. 1, the ash box 4 is not exposed for use. When the closure panel is positioned as shown in FIG. 2, the interior of the ash box element 2 is exposed and the ash box 4 can be used as a receptable in the normal manner. Due to the manner in which the ball bearings roll within the beads 5 and 32, the panel may be moved very easily and no sticking or cocking occurs. When the ash box is exposed for use, the closure panel 30 merely depends from the ash box element 2 as the ball bearings 44 reach the extremities of the beads 5 and 32. In this position, the spring 33 of the holding means 60 is disengaged from the button 7 as shown in FIG. 5. When the closure panel 30 is moved upwardly as described, the spring 33 associated with the closure panel 30 engages the button 7 on the front face of the ash box element 2 as shown in FIG. 6. This is a frictional, spring engagement, occurring at the moment the closure panel covers the ash box element 2 as shown in FIG. 1. This spring engagement prevents the closure panel 30 from simply falling down to the position shown in FIG. 2, retaining the closure panel in position. By merely applying a slight downward force to the closure panel 30, the spring 33 is disengaged from the button 7 and the closure panel may be moved to the position shown in FIG. 2.

It will be seen that this invention has provided a unique ashtray for an automobile and the like which can be mounted for utilization within the dashboard and be totally free of protrusions extending therefrom. Opening and closing of the ashtray structure is achieved very easily through vertical movement of certain of the components. This has been accomplished through the use of a relatively simple structure and one which utilizes the advantages gained from associated movement achieved through contact of ball bearings with the moving parts.

While it may be possible to practice this invention through the utilization of certain other embodiments, these other embodiments are considered to be within the spirit and scope of this invention as described in the following claims.

I claim:
1. An ashtray adapted to be mounted in the interior of an automobile and the like, comprising: an ash box element including a pair of generally vertically extending tracks at its sides; a closure panel including a pair of generally vertically extending tracks at its sides; a carriage element having means for retaining ball bearings at its sides; ball bearings positioned in said retaining means, said ball bearings exposed to lie in said tracks of said ash box element and said closure panel whereby said closure panel is vertically movable with respect to said ash box element through said ball bearings rolling in said tracks; and holding means associated with said closure panel and said ash box element to releasably hold said closure panel in a position covering said ash box element.

2. An ashtray as defined in claim 1, said holding means comprising a spring frictionally engageable with a bearing element.

3. An ashtray as defined in claim 1, said tracks comprising generally vertically extending elongated beads formed in the sides of said ash box element and said closure panel and said holding means comprising a spring frictionally engageable with a bearing element.

References Cited
UNITED STATES PATENTS

| | | | |
|---|---|---|---|
| 3,109,688 | 11/1963 | Middleton | 312—246 |
| 3,285,683 | 11/1966 | Middleton et al. | 312—246 |
| 3,295,903 | 1/1967 | Middleton | 312—246 |
| 3,351,404 | 11/1967 | Blake | 312—246 |

CASMIR A. NUNBERG, *Primary Examiner.*

U.S. Cl. X.R.

206—19.5; 312—242